E. Webber,
Churn.
No. 12,043.      Patented Dec. 5, 1854.
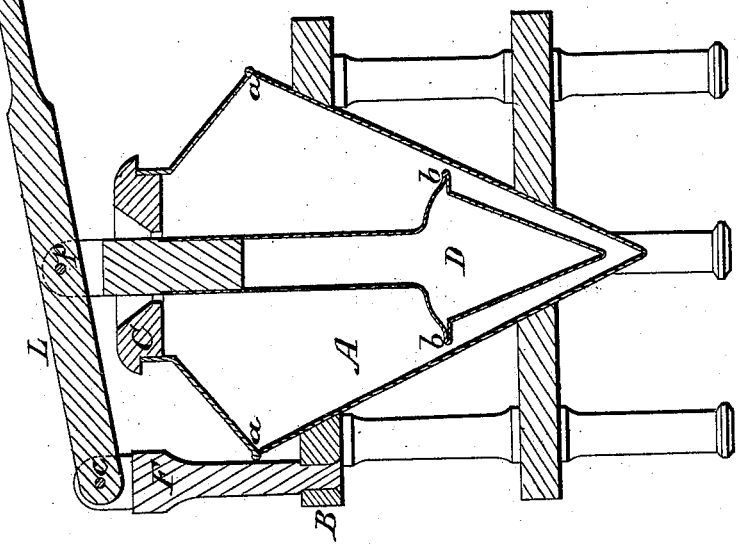
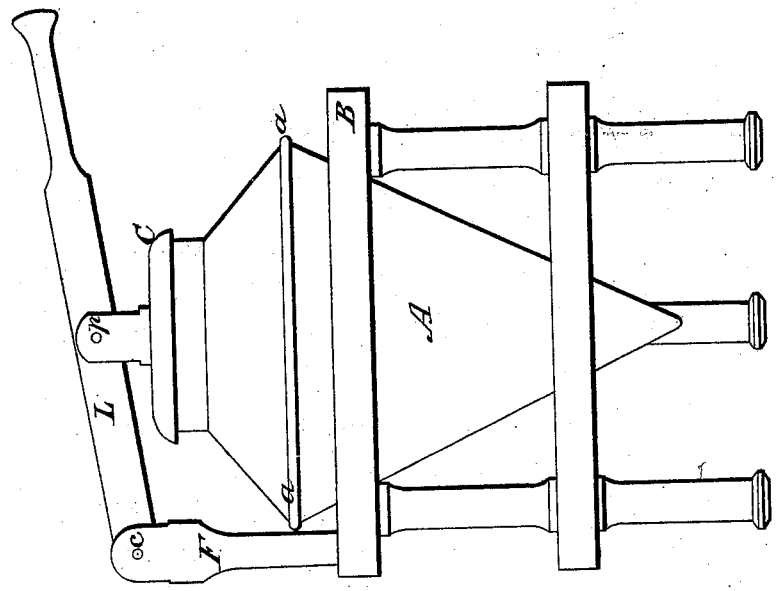

UNITED STATES PATENT OFFICE.

ELBRIDGE WEBBER, OF GARDINER, MAINE.

CHURN.

Specification of Letters Patent No. 12,043, dated December 5, 1854.

*To all whom it may concern:*

Be it known that I, ELBRIDGE WEBBER, of Gardiner, in the county of Kennebec and State of Maine, have invented a new and useful Improvement in Churns; and I do hereby declare that the following is a full, clear, and exact description of the construction and operation of the same, reference being had to the annexed drawings, forming part of this specification, in which—

Figure 1 is a side elevation of the churn. Fig. 2 is a vertical section through the axis of the churn.

Similar characters of reference in the several figures denote the same part of the machine.

My invention consists in constructing the body of the churn in the shape of an inverted cone and with a dasher of the same form having a projecting flange around the base of the cone; which combination causes the forcing of the entire body of cream from the bottom of the churn at each stroke of the dasher, while the projecting flange creates a great friction and agitation of the cream; the whole operating as will be hereafter described to speedily transform cream to butter.

To enable others skilled in the art to make and use my invention I will proceed to describe its construction and operation.

In the drawing A is the body of the churn constructed in the form of an inverted cone, and supported by the frame B. From the base $a$ of the cone the sides incline inward a sufficient distance to leave an opening for admission of cream, and removal of butter. When the churn is in operation this mouth is closed by the perforated cover C. The dasher D is conical with a flange $b$ as shown in Fig. 2, and is attached by a pin to the lever L having its fulcrum at $c$ in the standard F.

The operation of my improved churn is as follows: After placing the cream in the churn and securing the mouth by the cover C, the dasher D is alternately raised and lowered by means of the lever L, the downward motion forcing up the cream from the body of the churn between the conical sides of churn and dasher, while the flange by intercepting its upward flow causes the current to be broken and deflected around said flange. The buoyancy of the dasher enables it to rise without effort on the part of the operator, while the cream suddenly resumes its position in the bottom of the churn. This operation displaces every particle of cream at each stroke, and by the friction and agitation thus produced rapidly transforms the cream into butter. After the churning, the pin $p$ is withdrawn so as to separate the lever L from the dasher, admitting of the withdrawal of the dasher for facilitating the removal of the buttermilk and butter.

The advantages of this churn are simplicity and economy of construction and effectiveness of operation. It is moreover capable of being kept clean with great ease, and will rarely become deranged in any of its parts and unfit for use.

What I claim as my invention and desire to secure by Letters Patent, is

The combination of the flanged inverted conical dasher D with the inverted conical cream chamber A arranged and operating as described for the purposes set forth.

In testimony whereof, I have hereunto signed my name before two subscribing witnesses.

ELBRIDGE WEBBER.

Witnesses:
JOSEPH M. MESERVE,
GEO. W. WAITT.